2,430,851

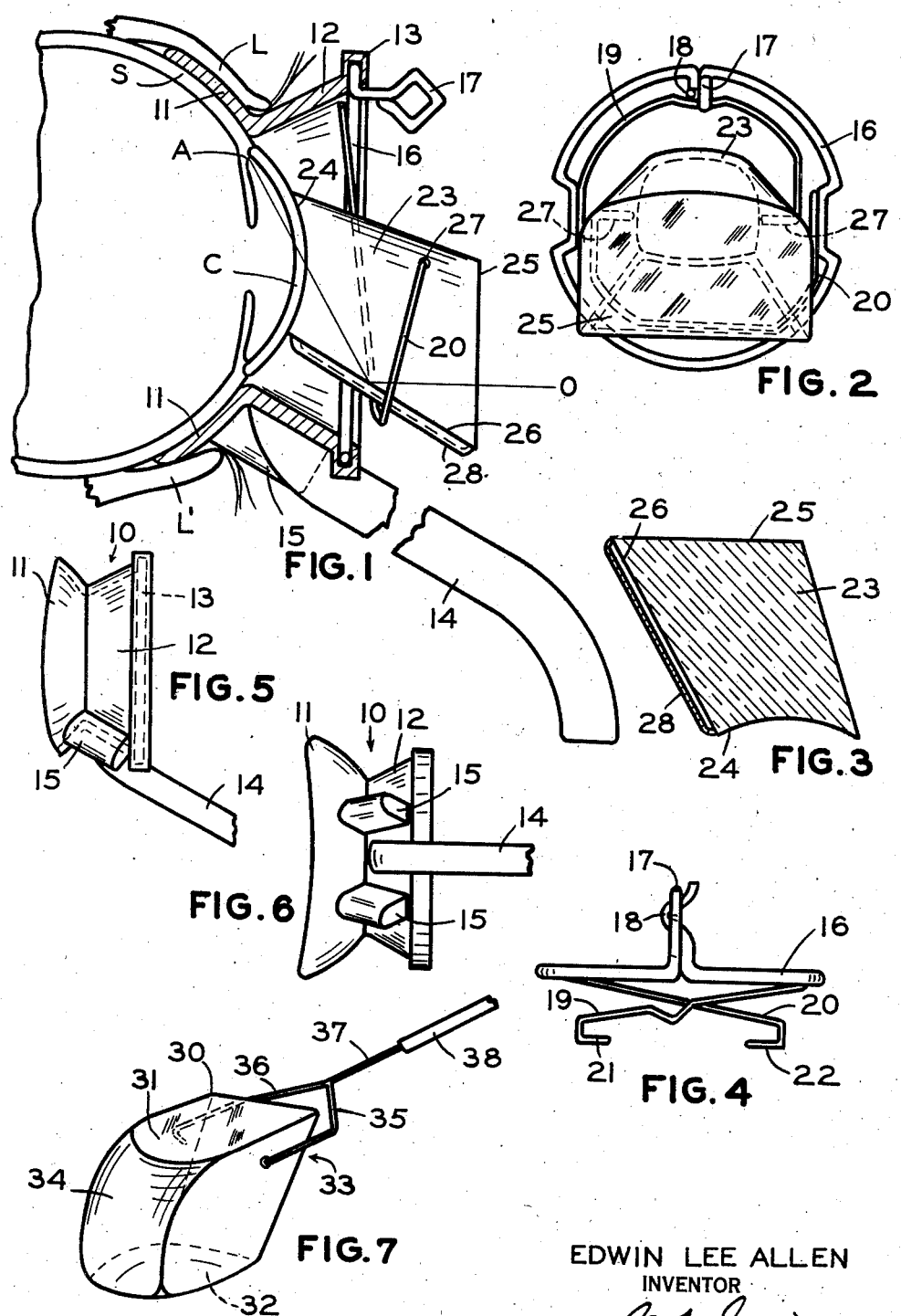
Nov. 18, 1947. E. L. ALLEN 2,430,851
DEVICE FOR EXAMINING THE ANTERIOR CHAMBER OF THE EYE
Filed Feb. 19, 1945
EDWIN LEE ALLEN
INVENTOR
BY
ATTORNEY Patented Nov. 18, 1947

UNITED STATES PATENT OFFICE 2,430,851

DEVICE FOR EXAMINING THE ANTERIOR CHAMBER OF THE EYE

Edwin Lee Allen, Iowa City, Iowa

Application February 19, 1945, Serial No. 578,782

10 Claims. (Cl. 88—20)

This invention relates to instruments for examining the eye and more particularly it has reference to a device which is used in gonioscopy for making a microscopical examination of the angle of the anterior chamber of the eye, also called the iris angle. As heretofore practised, gonioscopy has required the use of a spherical, cup-shaped contact lens having a relatively deep liquid chamber which is filled with liquid and then placed on the eye to be examined. Although such devices are intended to be held in place on the eye by means of the lids and scleral portion, slight additional pressure must also be applied in most cases in order to displace a small amount of liquid and form a slight vacuum between the lens and the eye. However, the lids frequently displaced the lens so that it either dropped out or caused an air bubble to enter the liquid chamber and thereby destroyed the optical path continuity which is essential for the functioning of the device. The pressure of the lids through the contact of the lens with the scleral portion is also apt to cause distortion of the tissues. Moreover, in using certain types of such prior art devices, the examination has to be made with the patient in a prone position and the observer must resort to the inconvenience of moving the viewing microscope and illuminating device around the eye in order to examine the entire circumference of the iris angle. Such lens devices cannot be safely used in the eye for more than about ten minutes because the blood supply is cut off due to the negative pressure between the lens and the eye. Because of these difficulties and disadvantages, gonioscopy has not been very widely employed in routine clinical examination even though the findings revealed in gonioscopy have great diagnostic value.

This invention has for its main object the elimination of these difficulties by providing a device which can be used in an efficient and practical manner for making a routine examination of the entire iris angle of the eye. Another object is to provide a viewing device of the type described which is resiliently mounted on a support so that the device may be easily held in position on the eye to view the angle of the anterior chamber. A further object is to provide a gonioscopic viewing device which is pivotally and rotatably mounted on a support whereby the device may be adjusted to view the entire iris angle. These and other objects and advantages reside in certain novel features of construction, arrangement, and combination of parts as will hereinafter be more fully described and pointed out in the appended claims.

Referring to the drawings:

Fig. 1 is a view of the device, with parts in section, showing the device in operative position on an eye.

Fig. 2 is a top plan view of the transparent viewing member and carriage.

Fig. 3 is a vertical sectional view of the transparent viewing member.

Fig. 4 is a side view of the carriage and mounting means for the viewing member.

Figs. 5 and 6 are fragmentary side views of the support.

Fig. 7 is a perspective of a modified form of the device.

One preferred embodiment of my invention is shown in the drawings wherein 10 indicates, generally, a support having an annular spherical portion 11, the inner surface of which is adapted to engage the scleral portion S of the eye under examination. Projecting outwardly from the portion 11 is a frusto-conical tubular part 12 which is provided at its end with a circular internal groove 13. A suitable handle 14 is secured to the support 10 to afford convenient means for manipulating and placing the device in position on the eye. The stop members 15, which are adapted to be engaged by the lower lid, are secured to the outer surface of portions 11 and 12 at each side of the handle 14 as shown in Figs. 5 and 6. The support 10 and its parts may be formed of any suitable material such as acrylic plastic or the like.

Rotatably mounted in the groove 13 is the carriage 16 which is formed of spring wire and has a substantially circular shape with the two ends of the wire terminating, respectively, in the offset loop 17 and catch 18. The carriage 16 should be formed so that it can be rotated easily while still permitting it to be held in adjusted position by frictional engagement with the groove. It will be apparent that by separating the two ends of the wire against the tension of the spring the carriage 16 may be removed from the support 10. Secured at diametrically opposite sides of carriage 16 are the ends of spring pivot wires 19 and 20 which are substantially semi-circular in shape and terminate in the spaced pivots 21 and 22. The carirage 16 may be formed of any suitable material such as, for example, No. 8 music wire while the pivot wires 19 and 20 may be formed of No. 1 music wire.

The transparent viewing member 23 has a polished concave spherical surface 24 having a radius of curvature of substantially 7.86 mm. Opposite the concave surface 24 is the plane polished surface 25 which makes an angle of substantially 60° with the downwardly extending plane polished reflecting surface 26. Two pivot holes 27 are formed adjacent the top and at opposite sides of the member 23 to receive the pivot pins 21 and 22 so that the member is pivotally supported on the carriage. It will be apparent that the viewing member is pivotally mounted on the long resilient pivot wires 19 and 20 which provide delicate supporting means. Since the carriage 16 is rotatable, the viewing member 23 is, in effect, universally mounted.

In using the device the contacting surface 24 may be wet with a drop of normal saline solution and the device then positioned on the eye, which has been locally anesthetized, with the upper lid L and the lower lid L' engaging the outer surface of portion 11 as shown in Fig. 1. The thin capillary film of tears between the cornea and surface 24 creates optical continuity between the member 23 and the cornea C and also serves to hold them together. With the patient seated erect at a standard slit lamp bio-microscope, the angle A of the anterior chamber is illuminated by a beam of light from the slit lamp, with the beam substantially normal to surface 25 and substantially coaxial with the viewing microscope. Light rays from the iris angle A will be reflected by the surface 26 and emerge through the surface 25 along the line AO to the microscope. In order to avoid decrease in reflection due to the condensation of moisture on the reflecting surface 26, a recessed shield 28 is cemented to the surface 26 so as to provide a free air space adjacent the surface 26 to prevent such condensation. Since the viewing member does not extend past the limbus, the eye may also be transilluminated through the sclera and limbus.

With the viewing member 23 in one position, it is possible to observe approximately one-quarter of the circumference of the iris angle. To examine the other portions of the iris angle, the viewing member 23 is merely rotated on the cornea by means of the carriage 16 which can be manipulated by the offset members 17, 18. Since the viewing member 23 is held by a delicate, resilient mounting, it may be rotated readily by carriage 16 without damage to the surface of the cornea and without breaking the adhesive capillary film between the member 23 and the cornea. The viewing member 23 may be formed of a transparent material such as glass or plastic. Since the upper lid usually extends over the cornea farther and is more powerful and active than the lower lid, the two stop members 15 will be engaged by the lower lid L' and so assist in holding the device in proper position. Although the handle 14 is used when placing the device in position on the eye, it will be understood that when it is in position the lids and scleral portion will usually hold it in place so that the observer's hands are both free to manipulate the microscope and illuminating means. Sometimes, however, when the lids and scleral portion are unable to hold the device, slight assisting pressure may be applied by means of handle 14.

The modification shown in Fig. 7 embodies the transparent viewing member 30 having the upper plane polished surface 31 which is opposite the concave polished surface 32 which is adapted to engage the cornea with a thin capillary liquid film intervening. The plane polished reflecting surface 33 forms an angle of substantially 60° with the surface 31. The member 30 may be formed of any suitable transparent material such as glass or plastic. The curved spherical surface 32 has a radius of curvature of substantially 7.86 mm. The member 30 also has the polished spherical refracting surface 34 which may be formed so as to provide magnifying power. The member 30 is pivotally mounted on the spaced wires 35 and 36 which engage openings formed in opposite sides of the member adjacent the upper surface 31. The wires 35 and 36 are secured to a suitably resilient wire member 37 attached to handle 38 so that the member 30 is pivotally and resiliently mounted on the handle.

It will be understood that the member 30 of Fig. 7 is not held by the lids and sclera but instead is held on the eye by means of handle 38. The resilient connection between the handle and the member 30 permits the latter to be held in position and rotated on the cornea without damage thereto. The member 30 may be used with a standard slit lamp bio-microscope to examine the iris angle by light rays which strike the reflecting surface 33 and emerge through the surface 31. The iris angle may also be viewed by looking directly through the refracting surface 34 with the unaided eye or with a loupe.

From the foregoing, it will be apparent that I am able to attain the objects of my invention and provide an improved device for routine, clinical gonioscopic examination. Both forms of the device can be easily rotated on the cornea so as to afford a view of the entire iris angle. It is unnecessary to use a relatively large amount of liquid between the cornea and transparent member and so there is little chance for air bubbles to form and break the optical continuity required. If bubbles do form, they can be removed readily by a slight relative movement between the member and the cornea. The devices may be used with patients sitting erect and they may be readily employed with various types of illuminating and viewing devices. The device shown in Fig. 1 can, without danger to the eye, be left in position as long as twenty minutes when it is desired to make detailed drawings of the parts under examination. Various modifications can obviously be made without departing from the scope of my invention as pointed out in the appended claims.

I claim:

1. A device for gonioscopic examination comprising a support, a transparent member for viewing the iris angle, said member having a single concave surface for engaging only the cornea of the eye with an intervening capillary liquid film to produce optical continuity between the member and cornea, and resilient hinge means connecting said member to said support whereby the member may be moved on the cornea by the support for viewing the entire iris angle without breaking the optical continuity or damaging the cornea.

2. A device for viewing the entire angle of the anterior chamber of the eye comprising a support, a transparent viewing member carried by the support, said member having a concave surface adapted to be placed against the cornea of an eye with a thin capillary film of liquid intervening, said member having a plane surface opposite said curved surface and a reflecting surface angularly disposed with respect to the plane surface for reflecting to the plane surface light rays which pass through said curved surface, said member being resiliently and hingedly mounted on said support whereby the member may be adjusted relative to the cornea for viewing all parts of the angle of the anterior chamber of the eye.

3. A device of the type described comprising a support having a surface adapted to engage the scleral portion of an eye, a member for viewing the iris angle, said member having a concave surface adapted to be positioned on the cornea of the eye with an intervening capillary film, and cooperating means on the support and member for rotatably mounting the member on the support whereby the member may be adjusted for viewing all parts of the angle of the anterior chamber of the eye.

4. A device of the type described comprising a support, a transparent member for viewing the iris angle, said member having a concave surface adapted to be positioned against a thin film of liquid on the cornea of an eye, said member having a plane surface opposite said curved surface and a plane reflecting surface angularly disposed relative to said first named plane surface for reflecting through the plane surface light rays which pass through the curved surface, and means for mounting said member for rotational and pivotal movements relative to the support whereby the member may be adjusted to various positions on the cornea of an eye for viewing all parts of the angle of the anterior chamber of the eye.

5. A device of the type described comprising a support having an annular surface adapted to engage the sclera of an eye, a curved track portion on said support, a carriage movably mounted on said track portion, a transparent member for viewing the iris angle, said member supported by the carriage and having a concave surface adapted to be positioned against a thin film of liquid on the cornea of the eye whereby the member may be adjusted relative to the support for viewing all parts of the angle of the anterior chamber of the eye.

6. A device of the type described comprising a support having an annular surface adapted to engage the sclera of an eye, a circular track carried by the support above said surface, a carriage rotatably mounted on said track, a transparent viewing member having a concave surface adapted to be positioned on the cornea of the eye with a thin liquid film between the cornea and the surface, said member having two angularly disposed plane surfaces one of which is positioned opposite said curved surface and the other of which is a reflecting surface whereby light rays passing through said curved surface from the angle of the anterior chamber of the eye are reflected by the reflecting surface through the first named plane surface, and resilient hinge means for mounting said member on the carriage whereby the member may be adjusted to view all parts of the angle of the anterior chamber of the eye.

7. A device for examining the eye comprising a support, a transparent viewing member for viewing the iris angle, said member movably carried by said support, said member being formed with a concave surface having a radius of curvature which is substantially the same as the radius of curvature of an average cornea, said surface being adapted to be positioned against a thin film of liquid on the cornea of the eye to be examined, said member having a reflecting surface positioned to reflect light rays passing through said concave surface, and shield means positioned adjacent the reflecting surface for preventing the condensation of moisture on the reflecting surface.

8. A device of the type described comprising a support having a portion provided with an annular spherical surface adapted to engage the sclera of an eye, a frusto-conical member projecting from said portion, said member having a circular groove, a carriage rotatably mounted in said groove, a transparent member for viewing the iris angle of the eye, said last named member having a concave surface adapted to contact a thin film liquid on the cornea of the eye, said transparent member being pivotally mounted on said carriage whereby the transparent member may be adjustably positioned to view the entire iris angle, and stop means on said portion for engagement with the lower eyelid for positioning the support relative to the eye.

9. A device for examining the eye comprising a transparent viewing member having a concave surface adapted to be positioned against a thin film of liquid on the cornea, a first plane surface opposite said concave surface, a second plane surface extending downwardly at an angle to said first plane surface for reflecting through said first surface light rays which pass through the concave surface, a convex surface opposite said second plane surface for directly viewing the iris angle through the concave surface, spaced resilient elements pivotally supporting said member, and supporting means secured to said elements whereby the member may be placed in contact with the cornea and adjustably positioned thereon.

10. In a device for examining the eye, the combination of a transparent viewing member having a concave surface adapted to be positioned on the cornea of the eye with a thin liquid film between the cornea and surface, said member having an integral plane reflecting surface positioned opposite said curved surface whereby light rays passing through said curved surface from the angle of the anterior chamber of the eye are internally reflected by said plane surface so that they may be received by the eye of an observer, and shield means covering the reflecting surface for preventing the condensation of moisture thereon.

EDWIN LEE ALLEN.

REFERENCES CITED

The following references are of record in the file of this patent:

UNITED STATES PATENTS

| Number | Name | Date |
| --- | --- | --- |
| 47,382 | Bausch | Apr. 25, 1865 |
| 1,528,192 | Brierton | Mar. 3, 1925 |
| 1,548,780 | Herbert | Aug. 4, 1925 |
| 1,602,487 | Hedley et al. | Oct. 12, 1926 |
| 1,891,041 | Bennett | Dec. 13, 1932 |
| 2,117,770 | Row | May 17, 1938 |
| 2,210,191 | Tronnier | Aug. 6, 1940 |
| 2,255,197 | Thomas | Sept. 9, 1941 |
| 2,358,348 | Pierson et al. | Sept. 19, 1944 |

OTHER REFERENCES

Duke-Elder, "Test-Book of Ophthalmology," 1943. Published by Mosby Co., St. Louis. Pages 1148 and 1149 relied upon. (Copy of text in National Institute of Health, Bethesda, Md.)